United States Patent

Caesar et al.

[11] Patent Number: 6,137,538
[45] Date of Patent: Oct. 24, 2000

[54] BUS SYSTEM FOR A TELEVISION SIGNAL PROCESSING DEVICE

[75] Inventors: Knut Caesar, Freiburg; Manfred Juenke, Gundelfingen; Stefan Keller, Freiburg, all of Germany; Stefan Rohrer, Chepen, Peru; Thomas Himmel, Ettenheim, Germany; Kai Scheffer, Denslingen, Germany; Eric Schidlack, Freiburg, Germany

[73] Assignee: Micronas Intermetall GmbH, Freiburg, Germany

[21] Appl. No.: 08/970,945

[22] Filed: Nov. 14, 1997

[30] Foreign Application Priority Data

Nov. 16, 1996 [EP] European Pat. Off. ............ 96118424

[51] Int. Cl.[7] ............................. H04N 5/445; H04N 7/00; H04N 5/44; H04N 5/46
[52] U.S. Cl. ...................... 348/564; 348/564; 348/552; 348/554; 348/558
[58] Field of Search ..................................... 348/552, 554, 348/555, 558, 563, 564, 569, 461, 467, 468, 473, 474, 10, 714, 723, 725, 705, 706

[56] References Cited

U.S. PATENT DOCUMENTS

| | | | |
|---|---|---|---|
| 5,121,205 | 6/1992 | Ng et al. | 358/141 |
| 5,168,356 | 12/1992 | Acampora et al. | 358/133 |
| 5,455,629 | 10/1995 | Sun et al. | 348/466 |
| 5,784,110 | 7/1998 | Acampora et al. | 348/423 |
| 5,802,311 | 9/1998 | Wronski | 395/200.66 |
| 5,880,789 | 3/1999 | Inaba | 348/564 |
| 5,883,670 | 3/1999 | Sporer et al. | 348/384 |

Primary Examiner—John K. Peng
Attorney, Agent, or Firm—Arthur L. Plevy; Buchanan Ingersoll PC

[57] ABSTRACT

Bus system (1, 2, 3) for a television signal processing device for transferring video data (d8) of at least one video data source (8) and/or supplementary data (d10) of one or more supplementary-data sources (10) between a transmitter (1) and a receiver (3) by means of a bus (2), wherein at the transmitter end (1), a single data stream (d2) for the bus (2) is formed from the video (d8) and/or supplementary data (d10) by means of an interface circuit (4). The interface circuit (4) combines the video and/or supplementary data, source by source, into blocks (db; db1, db2) following each other successively in time and containing identification data (dk; sk, ik) for start and end, or start and length, and content identification, and transfers the blocks serially.

18 Claims, 2 Drawing Sheets

BUS SYSTEM FOR A TELEVISION SIGNAL
PROCESSING DEVICE

FIELD OF THE INVENTION

This invention relates to bus systems for telecommunications equipment and, in particular, to a bus system with a matched transmitter and receiver for a digital television processing device which may also be implemented as a multimedia processing device.

BACKGROUND OF THE INVENTION

In present-day television receivers and in multimedia PCs (=personal computers), increasingly powerful processors are available for signal processing, so that it is possible simply by suitably programming the processors and with little additional circuitry to process a multitude of television standards with text, audio, and further information and to reproduce these standards on the existing output devices. Multimedia systems with high-resolution television or computer screens and powerful sound reproduction equipment offer particularly many possibilities of presentation and reproduction. The high data rate of the video data sources and the multitude of possible supplementary data place exacting requirements on the respective bus systems, which are generally implemented as parallel bus systems. For the different data streams, separate busses are used depending on clock rate and data capacity. Here, bottlenecks occur in multistandard television receivers and particularly in multimedia systems, because for each bit of the data to be transferred over a parallel bus, a respective package terminal is required at the transmitter and receiver ends, which are generally formed by monolithic integrated processors. However, the number of terminals available for bus connections is limited for reasons of cost, area, and wiring, and represents a major obstacle to the increasingly complex exchange of data between the individual processors.

It is therefore an object of the invention to provide for a digital television signal processing device, which may also be implemented as a multimedia processing device, a flexible bus system for video and supplementary data which can be adapted to different television standards and to different processing devices. In particular, the transmitter of the bus system is to be optimized in such a way as to be capable of cooperating both with existing, generally simple receivers and with highly flexible, complex receivers whose powerful processors are adaptable to the bus system without circuit modification simply by one-time programming.

SUMMARY OF THE INVENTION

A bus system for a signal processing device for transferring video data of at least one video data source and/or supplementary data of at least one supplementary-data source between a transmitter and a receiver by means of a bus, said transmitter including an interface circuit for forming a single data stream for the bus from the video and/or supplementary data, wherein said interface circuit combines the video and/or supplementary data, source by source, into blocks at a particular data rate and following each other successively in time and containing identification data for start and end, start and length, or content identification, wherein the video data are originally locked to a first clock and the supplementary data are originally locked to the same or at least a second clock; wherein the data rate of the transferred blocks is defined by a third clock whose clock rate is locked to that of the first or said at least second clock or to the data processing rate of the receiver end of the bus system; and wherein the receiver includes a recognition device operable to separate the individual blocks from the received data stream via the identification data to enable further processing.

BRIEF DESCRIPTION OF THE DRAWINGS

The invention and further advantageous features thereof will now be explained in more detail with reference to the accompanying drawings, in which.

DETAILED DESCRIPTION OF THE INVENTION

Before embarking on a detailed discussion, the following should be understood. The bus system of the present invention serves to transfer video data of at least one video data source and/or supplementary data of one or more supplementary-data sources between the transmitter and the receiver by means of data lines, i.e., a so-called bus.

The bus interconnects spatially separated signal-processing devices, e.g., processors, which interact in one or more pieces of equipment. In the simplest case, the bus interconnects signal processing devices on a printed circuit board. A particular difficulty may be that the clock signals of the signal processing devices do not match.

Applications for such bus systems are in television receivers, for example, which are to process standard or nonstandard television signals, as required, as well as supplementary data, such as stereo or multichannel sound, videotex information, or information of television-signal-related data services. So far, the individual functions have, as a rule, been performed by special-purpose processors which transfer the respective data over busses to the output devices or to other processors.

Figure 1:
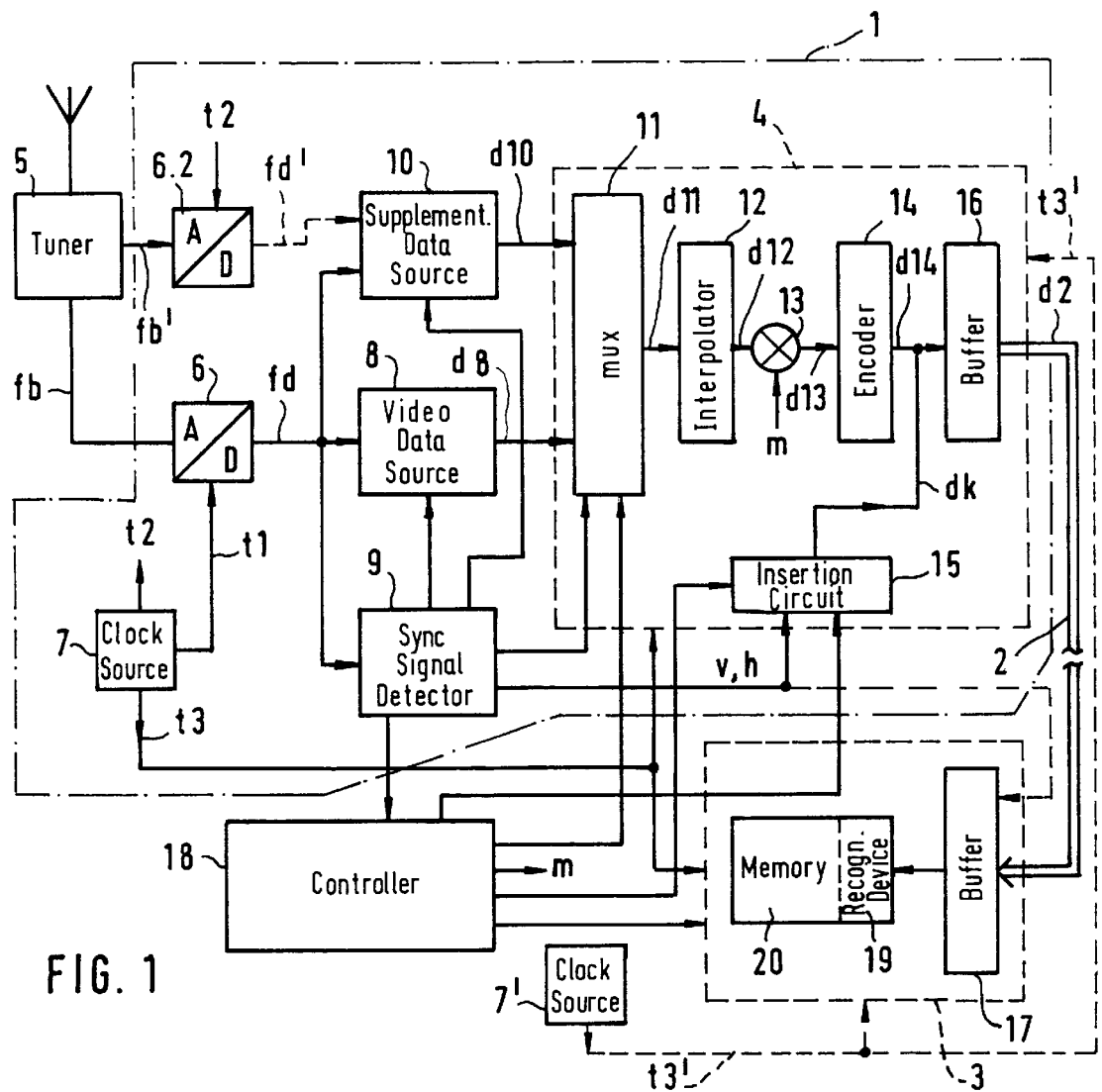
FIG. 1 is a schematic block diagram of a bus system according to the invention.

Referring now to FIG. 1, there is shown a schematic block diagram of an embodiment of a bus system according to the invention. The bus system can be roughly divided into three portions, a transmitter portion 1, a bus 2, and a receiver portion 3.

Transmitter portion 1 comprises the devices for forming the video- and supplementary-data streams. These data streams are combined into a single data stream by an interface circuit 4, whose output provides the data to be transferred over bus 2. In FIG. 1, transmitter portion 1 is circumscribed by a dash-dot line, this boundary being appropriate, but not mandatory, for a monolithic integration of transmitter 1.

In the embodiment of FIG. 1 it is assumed that a tuner and intermediate-frequency stage 5 receives a television signal and converts it into a lower frequency range, so that the converted signal fb can be digitized by means of an analog-to-digital converter 6. The associated digitization clock t1 is provided by a clock source 7, which also delivers further clock signals t2, t3. The signal fb may also be provided by a device other than the tuner and intermediate-frequency stage 5, such as a cable tuner, a video recorder, a video camera, or a computer with multimedia capability, if these devices make the signal available in the usual form as a television or video signal or as a video recorder output signal, e.g., an "S-VHS" signal.

In transmitter 1, the digitized television signal fd appearing at the output of analog-to-digital converter 6 is fed to simple signal-preprocessing stages which are adapted to the respective standard of the video or supplementary signal and which are commonly used in digital television receivers. The video-signal preprocessing takes place in a stage 8, henceforth called "video data source", which contains those stages with which the brightness and color information can be separated or decoded from the digitized signal fd. A further signal processing device 9, henceforth called "sync-signal detector", derives from the digitized signal fd the horizontal and vertical synchronizing signals h, v, which are also necessary for the proper functioning of video data source 8, for example. A further data processing stage 10, henceforth called "supplementary-data source", is also supplied with the digitized signal fd. Supplementary-data source 10 detects, for example, teletext data or those data in the digitized signal fd which are already contained as data in the analog television signal fb. Since their data rate is substantially lower than that of the digitized video signals, these data can be processed at a lower clock rate. It may therefore be advantageous if the tuner and intermediate-frequency stage 5 performs a separate frequency conversion for these data, so that the digitization can be performed at a lower clock rate, namely at the clock rate t2 by a separate analog-to-digital converter 6.2.

It is pointed out that aside from the sources 8 and 10 shown in FIG. 1, further sources may be present. In certain video recorder systems, for example, brightness and color information is stored separately, so that separate processing in separate video data sources suggests itself. Similarly, it may be more advantageous to connect specialized, but simple supplementary-data sources in parallel than to provide only a single one which is universal but very bulky.

In interface circuit 4, the output signals d8, d10 from the individual sources 8, 10 are combined into a single data stream d11 by means of a multiplexer 11. Since the data in the respective data stream d11 originate from only one of the sources 8, 10 for at least the duration of one line, the data d8, d10 can be adapted by means of an interpolator 12 to the number of sample values predetermined by the receiver end 3, i.e., the reproducing apparatus. Advantageously, the interpolation is determined by the processing rate of receiver 3, which corresponds to the third clock rate t3 in FIG. 1. This is particularly necessary if receiver portion 3 is controlled at a fixed clock rate, for example if a personal computer is provided as a multimedia reproducing unit. If, however, receiving portion 3 forms part of a television receiver, clock rate t3 will, as a rule, correspond to the system clock rate and will thus be identical to the digitization rate t1. Digital television receivers frequently have a system clock rate of 20.25 MHz, while PCs frequently run at 13.5 MHz. In the case of image or text reproduction via a PC, interpolator 12 in interface circuit 2 would reduce the sampling rate to 66.6 percent of the digitization rate of the television signal fb, with the transmission rate on bus 2 corresponding to the 13.5-MHz system clock of the PC.

The output signal d12 of interpolator 12 can be changed by means of a multiplier 13. If the output signals d8, d10 are normalized, multiplier 13 can, as a rule, be dispensed with. The individual sources 8, 10 may also have separate multipliers associated with them. In the simplest case, a simple arithmetic shift is performed.

Figure 4:
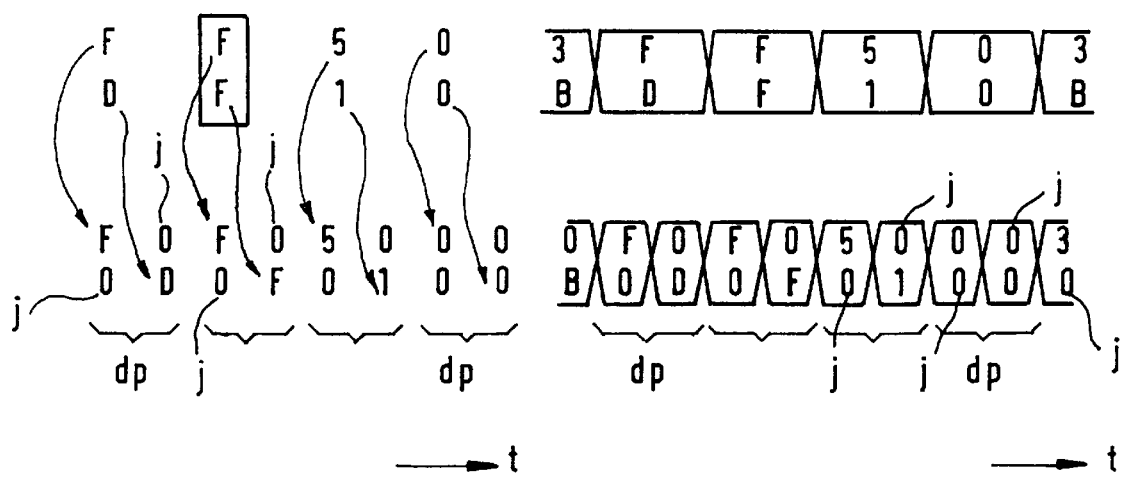
FIG. 4 shows a conversion of a data sequence into hexadecimal notation.

The output signals d11, d12, and d13 may be converted by means of an encoder 14 in order to increase the redundancy of the data d2 to be transferred or avoid particular data configurations (cf. the statements in connection with FIG. 4). The redundancy may be increased by appending a parity bit, for example.

By means of an insertion circuit 15, identification data dk (see FIG. 2) are inserted into the data stream d14 at the beginning and end of each data block to be transferred. With the identification data dk, the start and end or the length of the respecive block db to be transferred is identified. Also inserted is a content identification ik which provides information about the content of the respective data block. Via this content identification ik, source-related separation and processing of the individual data blocks is possible at the receiver end 3. The identification data dk may be composed of data words or data sequences.

The output section of interface circuit 4 is formed by a buffer 16 or FIFO (=first in, first out) which can compensate for differences in clock rates between the data stream d14 and the data stream d2 on bus 2. As a rule, the receiver end 3 also contains a buffer 17 or FIFO in the input section in order to compensate for differences between the clock phases and/or data rates of bus 2 and receiver 3. Synchronization of transmitter 1 and receiver 3 via buffers 16, 17 can also be accomplished by controlling buffer 16 with a clock signal t3' from a clock source 7' locked to receiver 3.

The block diagram of FIG. 1 also shows a controller 18, whose function can be easily implemented with a microprocessor at the transmitter or receiver end 1, 3, for example. By means of the controller 18, multiplexer 11, for example, can be held in a stationary mode.

Controller 18 also supplies a multiplication factor m to multiplier 13 if necessary. Furthermore, the insertion of all or part of the identification data dk via insertion circuit 15 can be suppressed with controller 18. The suppression of all or individual identification data dk and the halting of multiplexer 11 correspond to different operating modes which also have effects on receiver 3. For testing purposes, for example, it may be necessary to have the digitized signal fd or one of the signals d8, d10 available in receiver 3 for a prolonged period of time. For that case, interface circuit 4 and, if necessary, source 8 or 10 are switched by controller 18 into a state in which signals can pass therethrough. The control lines necessary for this purpose are not shown in FIG. 1 for the sake of clearness.

The identification data dk are stored in insertion circuit 15 and can be retrieved by controller 18 according to the respective standard. Via specific programming means, which are not shown in FIG. 1, the identification data dk can be programmed in insertion circuit 15.

In receiver 3, buffer 17 is followed by a recognition device 19 which is coupled with a frame memory 20. Depending on the identification data dk transferred or on line and field counts obtained via additionally transferred vertical and horizontal control signals v and h, respectively, the data d2 received over bus 2 are written into the associated areas of memory 20. From there, they can be read by the reproduction unit as video or supplementary data at arbitrary points of time. On the screen, simultaneous reproduction of image and text, also from different sources, is thus made possible. In the simplest case, receiver 3 does not differ from conventional receivers in simple television signal bus systems.

Figure 2:
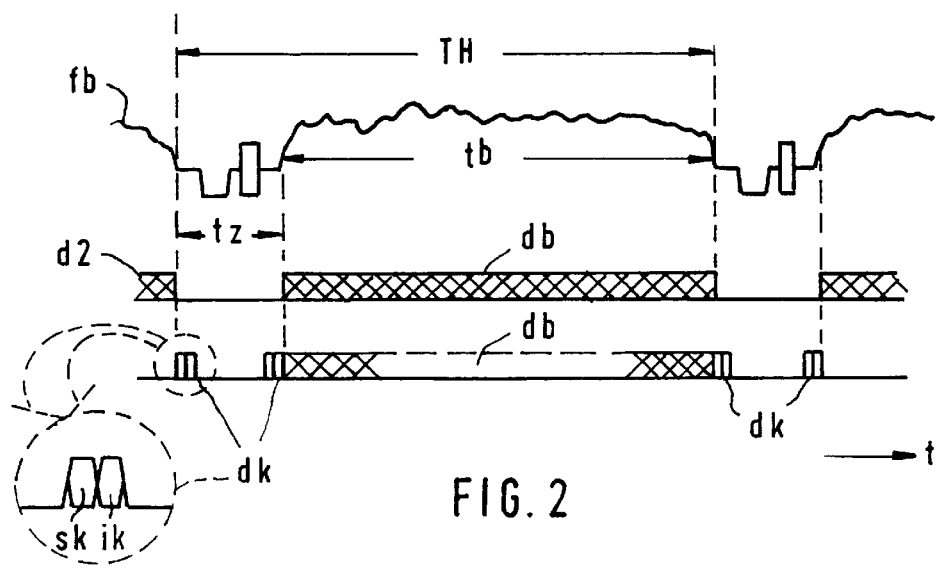
FIG. 2 shows signals of the bus system of FIG. 1 in a timing diagram.

FIG. 2 shows some signals of the bus system of FIG. 1 in a schematic timing diagram. The first line shows schematically the analog television signal fb, which corresponds to the digitized signal fd at the output of analog-to-digital converter 6. The line period TH contains the horizontal retrace interval tz and the picture interval tb. During the vertical retrace, during which the picture reproduction unit is blanked, the television signal, as mentioned, may, during some lines in interval tb, contain supplementary data, such as signals or data for "PAL-Plus", "VPS", "CAPTION", "WST", "WSS", "ANTIOPE", "TELETEXT", "NABTS", "VITC", and others. Thus, no collision can occur between video data and supplementary data during the preprocessing of the signals at the transmitter. The assignment of supplementary data and video data is effected via time windows which are determined by evaluating the separated horizontal and vertical synchronizing signals in sync-signal detector 9.

The second line shows the data stream d2 transferred on bus 2. During the horizontal retrace intervals tz, either no data transfer takes place on bus 2 or the respective transferred data are regarded as insignificant at the receiver end 3, because they have no valid identification data dk. The data stream d2 contains distinguishable data blocks db whose start and end are determined by identification data dk which are added to the respective data block db, see the third line of FIG. 2. In the simplest case, the identification data dk at the start of a block are composed of a start identification sk and a content identification ik. In the simplest case, the identification data dk consist of two data words, but they may also comprise an entire data sequence. The content identification ik may contain information about the respective data block length if data blocks of different lengths have to be transferred over bus 2. To identify the end of a block, however, the identification data dk are simply repeated or a separate end identification is inserted. In the case of the start identification it is important that it contains no data word or no data sequence which may occur in the subsequent data block. In the case of digitized analog signals, particularly if such signals are normalized, this requirement is not very difficult to meet if the extreme values of the existing data range are used for the start and end identifications, for example the binary values 0000 . . . or 1111 . . . for positive binary numbers. The omission of these extreme digitization ranges for data to be transferred on the bus does not constitute a major limitation. Things are different if supplementary data are to be transferred, which may contain any of the possible data words in principle.

Figure 3:
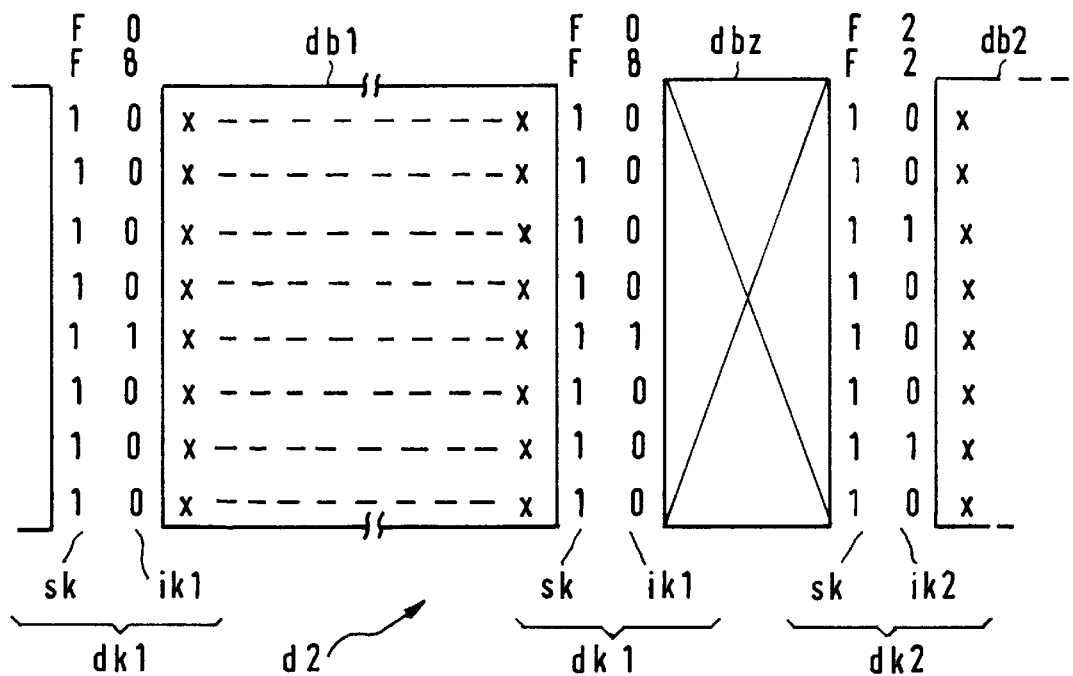
FIG. 3 shows an example of a transferred data sequence.

In FIG. 3, the data stream d2 transferred on bus 2 is illustrated schematically by a numerical example, with each data word comprising 8 bits. An 8-bit data word is commonly referred to as a byte. A first data block db1 begins with a start identification sk consisting of only is, which corresponds to the hexadecimal code "FF". The content identification ik1 is in the hexadecimal code "08". The two identifications together form a first block identification, namely the identification data dk1. By the latter, the first data block db1, which contains supplementary data, for example, is announced on the data bus. The end of the data block db1 is signaled by a repetition of the identification data dk1, i.e., by the same data sequence "FF, 08" as at the start of the block.

The subsequent data dbz, which may occur in the horizontal retrace interval, are disregarded at the receiver end 3. Only when the start identification sk reappears will recognition device 19 activate the source-related storing of the received data d2 in memory 20.

The byte following the start identification sk has the hexadecimal code "22" and determines the content of a second data block db2. The identification data dk2 of the second block db2 can thus be represented in the hexadecimal code by "FF, 22". In this manner, the data transfer on the bus progresses from block to block.

The above-mentioned collision of identification data dk with the data content of the blocks to be transferred can be avoided by converting the supplementary data d10 into another code by means of encoder 14. The invention takes advantage of the low data rate of the supplementary data d10 by splitting the respective data word into two or more ranges and transferring the separate ranges in successive data words which are complemented so that the forbidden binary states do not occur. This is shown schematically in FIG. 4 by means of a byte sequence in the hexadecimal code. Each byte is split into two bit ranges of equal size to form a byte pair dp which is transferred as a new data sequence. The left-hand portion of the figure illustrates the relationship between the old and new positions of the two byte ranges and their respective complements j. The resulting data sequence is shown on the right-hand side. The "forbidden" data sequence "FF" is no longer present in the block content of the new data stream and is thus available exclusively for the identification data dk. The increase in the data rate to the double value is of no consequence at the low data rate of the supplementary data.

As one can ascertain from the preceding discussion, the invention, besides reducing the number of terminals required at the transmitter and receiver ends as well as the number of bus lines, has the advantage of providing increased flexibility for the respective application. Furthermore, only a single interface circuit is necessary for the video- and supplementary-data sources at the transmitter end. The identification of the transmitted data blocks by start and end, or start and length, and content identification data permits simple separation at the receiver end. At the receiver end, the evaluation of the horizontal and vertical synchronizing signals for determining the respective television signal line number can be dispensed with. As a rule, the programmable recognition devices in the receiver-side processors will be sufficient for the separation Conflicts in the assignment of data at the receiver end are reliably avoided by the identification data, even if the data blocks are transferred in "wrong" lines, e.g., for testing purposes or for television subtitling. As a rule, however, the source-related data streams are transferred block by block, without interchange on the bus, according to the close relationship with the line-scanning pattern of the respective composite color signal.

In the television signal, the source-related signals are assigned to different lines, so that the individual data blocks are formed in different time intervals and can be transferred over the bus separately in time. The text data, for example in the teletext television standard, are inserted into the television signal only in particular lines of the vertical blanking interval—no video information is present in these lines. By the flexible control of the identification data, however, it is also possible to transfer text or other data over the bus during arbitrary lines or instead of entire pages. In those cases, too, reliable separation is possible at the receiver end via the respective identification without knowledge of the respective line number.

Advantageously, the applied video or supplementary data are preprocessed at the transmitter end in order to reduce the amount of data to be transferred and thus remove processing burden from the processor at the receiver end. This is particularly advantageous when processing text or audio data, because their data rate is substantially lower than that of video data and oversampling at the fixed video signal digitization clock rate uselessly increases the amount of data. According to the invention, specialized processing circuits which occupy only a relatively small area of the monolithic integrated transmitter circuit deliver these data with an adapted, i.e., the lowest possible, data rate. These data are transferred over the bus at a high data rate, but the transfer is complete after a short time, namely after arrival of the end identification. Until the arrival of the next start identification, the receiver can disregard the bus.

If the formation of data from the oversampled composite signal takes place only at the receiver end, which is also possible using a specific bus mode according to the invention, the digitized television signal or the output data of the individual preprocessing stages in the transmitter will be transferred over the bus unchanged. At the receiver end, the data of interest are then formed from the transferred data stream by means of a fast microprocessor, for example. Fast microprocessors in multimedia or television signal processing devices can be programmed for this inexpedient bus mode, but this requires a large part of the processing capacity which is then no longer available for other signal processing tasks. By the preprocessing at the transmitter end in accordance with the invention, however, considerable processing burden can be removed from the processors at the receiver end.

According to the invention, there is described a bus system for a television signal processing device for transferring video data of at least one video data source and/or supplementary data of one or more supplementary-data sources between a transmitter and a receiver by means of a bus, wherein: the video data are originally locked to a first clock and the supplementary data are originally locked to the same or a second clock or to further clocks; at the receiver end, a single data stream for the bus is formed from the video and/or supplementary data by means of an interface circuit, with the latter combining the video and/or supplementary data, source by source, into blocks following each other successively in time and containing identification data for start and end, or start and length, and content identification; the data rate of the transferred blocks is defined by a third clock whose clock rate is locked to that of the first or second clock or of one of the further clocks or to the data processing rate of the receiver end of the bus system; and at the receiver end, the individual blocks are separable from the received data stream via the identification data by means of a recognition device, and can thus be further processed.

What is claimed is:

1. A bus system for a signal processing device for transferring at least one of video data from at least one video data source and supplementary data from at least one supplementary-data source between a transmitter and a receiver by means of a bus, said transmitter including an interface circuit for forming a single data stream for the bus from the at least video or supplementary data, wherein said interface circuit combines the at least video or supplementary data, source by source, into blocks at a particular data rate and following each other successively in time and containing identification data for start and end, or start and length, and content identification, wherein:

the video data, if present, are originally locked to a first clock and the supplementary data, if present, are originally locked to the same or at least a second clock;

the data rate of the transferred blocks is defined by a third clock whose clock rate is locked to that of the first or said at least second clock if present or to a data processing rate of the receiver end of the bus system; and, said receiver includes a recognition device operable to separate the individual blocks from the received data stream via the identification data to enable further processing.

2. The bus system of claim 1, further including a controller coupled to said transmitter and receiver for changing the operating mode of the bus system.

3. The bus system of claim 2, wherein the controller is operative to allow video and supplementary data or only video data or only supplementary data to be transferred over the bus.

4. The bus system of claim 2, wherein the identification data, the content identifications of the individual blocks are suppressed by the controller.

5. The bus system of claim 2, wherein the controller causes the input data or output data of the respective video data source or supplementary-data source to be placed on the bus in unchanged form.

6. A transmitter for a bus system which transfers at least one of video and supplementary data between the transmitter and a receiver over a bus in a television signal or multimedia signal processing device, wherein:

the transmitter is fed with at least one of the video data from at least one video data source, and the supplementary data from one or more supplementary-data sources, the video data, if present, being originally locked to a first clock, and the supplementary data, if present, being originally locked to the same or at least a second clock;

the transmitter includes an interface circuit for forming a single data stream for the bus from the video, if present, and the supplementary data, if present, said interface circuit being operable to combine the video, if present, and the supplementary data, if present, source by source, into blocks following each other successively in time and containing identification data for start, end or length, and content identification, wherein the data rate of the transferred blocks is defined by a third clock whose clock rate is adaptable to the data processing rate of the receiver end of the bus system; and said interface circuit includes an encoder for encoding the supplementary data, the video data, and subsequent data into a code which avoids at least one given data sequence.

7. The transmitter of claim 6, wherein the interface circuit includes:

an interpolator for adapting the at least video or supplementary data to a number of sample values predetermined by the receiver; and a buffer responsive to the sample values output from said interpolator, for adapting the at least video or supplementary data of said samples to the third clock.

8. A bus system for a signal processing device for transferring video data from at least one video data source and supplementary data from at least one supplementary-data source between a transmitter and a receiver by means of a bus, said transmitter including an interface circuit for forming a single data stream for the bus from the video and supplementary data, wherein said interface circuit combines the video and supplementary data, source by source, into blocks at a particular data rate and following each other successively in time and containing identification data for start and end, or start and length, and content identification, wherein:

the video data are originally locked to a first clock and the supplementary data are originally locked to the same or at least a second clock;

the data rate of the transferred blocks is defined by a third clock whose clock rate is locked to the first or said at least second clock or to a data processing rate of the receiver end of the bus system; and, said receiver includes a recognition device operable to separate individual blocks from a received data stream via the identification data to enable further processing.

9. The system of claim 8, wherein the data rate of the transferred blocks is defined by a third clock whose clock rate is adaptable to the data processing rate of the receiver end of the bus system.

10. The system of claim 8, said transmitter further comprising a sync-signal detector coupled to the interface circuit for determining from a television signal locked to the video or supplementary data in what time intervals the video or supplementary data are available, and, for initiating the transfer of the corresponding identification data in the interface circuit for the blocks to be transferred.

11. The system of claim 8, wherein the interface circuit comprises:
    an interpolator for adapting at least the video or supplementary data to a number of sample values predetermined by the receiver; and
    a buffer responsive to the sample values output from said interpolator, for adapting at least the video or supplementary data of said samples to the third clock.

12. The system of claim 8, wherein the interface circuit comprises at least one multiplier for amplifying or attenuating at least the video or supplementary data.

13. The system of claim 8, wherein said interface circuit includes an encoder for encoding the supplementary data, the video data, and subsequent data into a code which avoids at least one given data sequence.

14. The system of claim 13, wherein the supplemental data is in a form of supplementary-data words and said encoder is operative to split the bits of each supplementary-data word into at least a first range and a second range and transfer said ranges separately by means of a corresponding number of complemented data words.

15. A transmitter for a bus system which transfers at least one of video and supplementary data between the transmitter and a receiver over a bus in a television signal or multimedia signal processing device, wherein:
    the transmitter is fed with at least one of the video data from at least one video data source, and the supplementary data from one or more supplementary-data sources, the video data, if present, being originally locked to a first clock, and the supplementary data, if present, being originally locked to the same or at least a second clock;
    the transmitter includes an interface circuit for forming a single data stream for the bus from the video, if present, and the supplementary data, if present, said interface circuit being operable to combine the video, if present, and the supplementary data, if present, source by source, into blocks following each other successively in time and containing identification data for start, end or length, and content identification, said transmitter further including a sync-signal detector coupled to the interface circuit for determining from a television signal locked to the at least video or supplementary data in what time intervals the at least video or supplementary data are available, and, for initiating the transfer of the corresponding identification data in the interface circuit for the blocks to be transferred; and
    said interface circuit includes an encoder for encoding the supplementary data, the video data, and subsequent data into a code which avoids at least one given data sequence.

16. A transmitter for a bus system which transfers at least one of video and supplementary data between the transmitter and a receiver over a bus in a television signal or multimedia signal processing device, wherein:
    the transmitter is fed with at least one of the video data from at least one video data source, and the supplementary data from one or more supplementary-data sources, the video data, if present, being originally locked to a first clock, and the supplementary data, if present, being originally locked to the same or at least a second clock; and
    the transmitter includes an interface circuit for forming a single data stream for the bus from the video, if present, and the supplementary data, if present, said interface circuit being operable to combine the video, if present, and the supplementary data, if present, source by source, into blocks following each other successively in time and containing identification data for start, end or length, and content identification, wherein the interface circuit comprises at least one multiplier for amplifying/ attenuating the at least video or supplementary data,
    said interface circuit includes an encoder for encoding the supplementary data, the video data, and subsequent data into a code which avoids at least one given data sequence.

17. A transmitter for a bus system which transfers at least one of video and supplementary data between the transmitter and a receiver over a bus in a television signal or multimedia signal processing device, wherein:
    the transmitter is fed with at least one of the video data from at least one video data source and the supplementary data from one or more supplementary-data sources, the video data, if present, being originally locked to a first clock, and the supplementary data, if present, being originally locked to the same or at least a second clock; and
    the transmitter includes an interface circuit for forming a single data stream for the bus from the video, if present, and the supplementary data, if present, said interface circuit being operable to combine the video, if present, and the supplementary data, if present, source by source, into blocks following each other successively in time and containing identification data for start, end or length, and content; and
    said interface circuit includes an encoder for encoding the supplementary data, the video data, and subsequent data into a code which avoids at least one given data sequence, and wherein said interface encoder also increases the redundancy of the data to be transferred.

18. The transmitter of claim 17, wherein the encoder is operative to split the bits of each supplementary-data word into at least a first range and a second range and transfer said ranges separately by means of a corresponding number of complemented data words.

* * * * *